United States Patent
Dick et al.

(10) Patent No.: US 6,689,197 B2
(45) Date of Patent: *Feb. 10, 2004

(54) DESICCANT COMPOSITION

(75) Inventors: Stefan O. Dick, Albuquerque, NM (US); Andrew J. Robertson, Albuquerque, NM (US); Julian Benavides, Albuquerque, NM (US); Richard M. Shelley, Belen, NM (US)

(73) Assignee: Sud-Chemie Inc., Belen, NM (US)

(*) Notice: Subject to any disclaimer, the term of this patent is extended or adjusted under 35 U.S.C. 154(b) by 305 days.

This patent is subject to a terminal disclaimer.

(21) Appl. No.: 09/835,793

(22) Filed: Apr. 16, 2001

(65) Prior Publication Data

US 2002/0014305 A1 Feb. 7, 2002

Related U.S. Application Data

(63) Continuation-in-part of application No. 09/348,397, filed on Jul. 7, 1999, now Pat. No. 6,217,701, which is a division of application No. 08/748,362, filed on Nov. 13, 1996, now Pat. No. 5,935,304, which is a continuation-in-part of application No. 08/715,067, filed on Sep. 19, 1996, now Pat. No. 5,743,942.

(51) Int. Cl.$^7$ .......................... B01D 53/02; B32B 31/20
(52) U.S. Cl. ........................ 96/118; 252/194; 156/308.4
(58) Field of Search .................. 55/522, 528; 95/91, 95/117; 96/118, 154; 156/308.4; 206/204, 484.1, 524.2; 252/194

(56) References Cited

U.S. PATENT DOCUMENTS

| 3,152,879 | A | | 10/1964 | Yale |
| 5,743,942 | A | * | 4/1998 | Shelley et al. ............ 96/118 |
| 5,935,304 | A | | 8/1999 | Shelley et al. |
| 6,217,701 | B1 | | 4/2001 | Shelley et al. |

FOREIGN PATENT DOCUMENTS

| EP | 0832686 | 4/1998 |
| JP | 61103523 | 5/1986 |
| JP | 61141916 | 6/1986 |
| JP | 1189328 | 7/1989 |
| JP | 2000005553 | 1/2000 |

OTHER PUBLICATIONS

European Search Report, Aug. 21, 2002.

* cited by examiner

Primary Examiner—C. Scott Bushey

(57) ABSTRACT

A desiccant composition containing a deliquescent salt and a modified starch containing from about 5 to about 95 percent of the deliquescent salt and from about 5 to about 95 percent of the modified starch.

25 Claims, 1 Drawing Sheet

DESICCANT COMPOSITION

CROSS REFERENCE TO RELATED APPLICATIONS

This is a continuation-in-part of application Ser. No. 09/348,397, filed Jul. 7, 1999, now U.S. Pat. No. 6,217,701, which is a divisional of application Ser. No. 08/748,362 filed on Nov. 13, 1996, now U.S. Pat. No. 5,935,304, which is a continuation-in-part of application Ser. No. 08/715,067, filed on Sep. 19, 1996, now U.S. Pat. No. 5,743,942.

BACKGROUND OF INVENTION

1. Field of Invention

This invention relates to desiccant containers. More specifically, this invention relates to a composition of material for use in a desiccant container comprising a combination of a deliquescent salt and a modified starch.

2. Prior Art

Desiccant containers which absorb water vapor, water, liquids and the like are well known in the art. Generally, these containers are comprised of a water or water vapor permeable packaging material formed from fibrous or film products securely sealed together at the edges of the packaging. The packaging material encapsulates a desiccant material, such as silica gel. The volume of water or water vapor absorbed by the desiccant container is generally determined by the absorbent capacity of the desiccant material contained within the container and the temperature and relative humidity level of the surrounding air.

One type of desiccant container absorbs both water vapor and liquid water by permitting both to pass through the packaging material to be absorbed by the desiccant material. In some circumstances, the packaging material for this type of product dissolves to permit the desiccant material contained within the desiccant container to have direct contact with the liquid.

Another type of desiccant container absorbs water vapor but not liquid water. The packaging material for this type of desiccant container is designed to prevent water absorbed within the desiccant container as water vapor from being released from the desiccant container in the form of liquid water.

There are many common products that are utilized as desiccating agents. Among the most common used include silica gel, calcium sulfate, calcium fluoride, activated charcoal, molecular sieves, lithium chloride, calcium chloride and other such products. A common list of drying agents is contained, for example, in Kirk-Othmer, *Encyclopedia of Chemical Technology*, Volume 7, pages 378–398. Common desiccating agents for use in conventional desiccant containers are also disclosed in U.S. Pat. No. 5,114,003, which discloses the use of a montmorillonite clay, silica gel, molecular sieve, calcium oxide, calcium sulfate and calcium chloride. The use of silica gel, alumino silicate, alumina, activated charcoal and molecular sieves as desiccating agents are disclosed in U.S. Pat. No. 4,464,261.

Commercial grade calcium chloride is a widely used desiccant due to its low cost and high degree of hygroscopicity. Calcium chloride compacted in the form of particles or beads is used as a drying agent, for example, in U.S. Pat. No. 3,923,944.

Mixtures and combinations of other materials have been blended with calcium chloride to form desiccating products. For example, polyethylene glycol was mixed with calcium chloride to form a desiccant product in U.S. Pat. No. 3,779,936. In addition, U.S. Pat. No. 3,334,468 discloses the use of sodium chloride or sodium carbonate with calcium chloride. Further, the combination of calcium chloride with magnesium, lithium or ammonium salts is disclosed, for example, in U.S. Pat. No. 3,885,926. The use of calcium chloride with a metal, for example, iron fillings, is disclosed in U.S. Pat. No. 1,798,862. Further, the use of activated carbon with calcium chloride as a desiccant product is disclosed in U.S. Pat. No. 2,027,093.

U.S. Pat. No. 3,390,511 discloses the use of calcium chloride placed on a carrier material for use as a gas dryer desiccant. The preferred material that is utilized as the carrier for the calcium chloride is sodium chloride. See also, U.S. Pat. No. 3,334,468. The desiccant product in U.S. Pat. No. 3,390,511 preferably comprised about 90 to 97 percent sodium chloride as the carrier and about 10 to about 3 percent calcium chloride. In addition, sodium dichromate and trisodium phosphate in minor amounts may be included in the product. While the preferred carrier for the calcium chloride was sodium chloride, other disclosed carriers included sugar, potassium chloride, potassium nitrate, sodium nitrate and starch. See column 3, line 33. The percentage of calcium chloride used in this product was percent or less, because the major component of the product was the carrier.

One of the problems in the utilization of calcium chloride as a desiccating agent is that when the water is absorbed, it forms a liquid mixture on the surface of the calcium chloride. This is discussed in U.S. Pat. No. 3,334,468. With conventional desiccant products this liquid may leak from the packaging which can cause problems, for example, if the desiccant product is used in storage containers.

There are situations where absorption of moisture by a desiccant product even at low humidity and low water vapor pressure is necessary, such as when the product protected by the desiccant product can be damaged by moisture. Usually traditional desiccants, such as desiccant clays, silica gel, molecular sieve and calcium sulfate are used in this situation. However, for some applications the capacity for absorption of moisture of these desiccant products is too low. An example where this problem can occur is the shipment of steel products overseas. In order to avoid the rusting of these steel products, it is important that the relative humidity level in the container holding those steel products be maintained below about 40 percent at 25° C. for as long as several weeks. While conventional desiccant products, such as silica gel, can be effective in absorbing moisture in some situations, they do not have the high capacity for absorption that is necessary for extended periods of time. Desiccant products with a higher capacity for absorption at humidity levels below 40 percent relative humidity are needed in this situation.

In other situations conventional desiccant products begin to absorb moisture at relative humidity levels which are unnecessarily low. In these situations a considerable portion of the absorption capacity of the desiccant product is wasted because moisture is absorbed at humidity levels where no damage can occur to the products being shipped with the desiccant product. In addition, if the humidity level then rises, there is a risk that these conventional desiccant products will not have sufficient remaining absorption capacity to absorb water vapor and protect the products being shipped.

In addition, it is sometimes difficult to utilize conventional desiccant products with products which inherently have a high moisture content, such as cocoa, coffee, tobacco and dog food. If the desiccant product absorbs too much moisture at relatively low humidity levels, these products may be damaged. Further, the high capacity of some desiccant products to absorb moisture is wasted in these situations. In addition, there is a risk that not enough absorption capacity will be available during the entire shipping process, especially when the humidity level rises.

While certain references disclose the use of calcium chloride and other deliquescent salts as a desiccant either alone or in combination with a number of different compositions, there is still a need for improved desiccant products utilizing calcium chloride and other deliquescent salts.

In addition, there is a need for a desiccant composition which can be useful in both low humidity and high humidity applications.

Therefore it is an object of this invention to disclose a desiccant composition containing calcium chloride and/or other deliquescent salts as its major component.

It is a still further object of this invention to disclose a desiccant composition containing calcium chloride or other deliquescent salts mixed with a significant amount of a modified starch to form the desiccant composition.

It is a still further object of the invention to disclose a desiccant composition contained within a packaging material, wherein the desiccant composition is a combination of calcium chloride or other deliquescent salts and a modified starch.

It is a still further object of this invention to disclose a desiccant composition containing calcium chloride or other deliquescent salts where water absorbed does not leak from the desiccant container.

It is a still further object of this invention to disclose a desiccant composition contained within a packaging material wherein the desiccant composition prevents leakage of water from within the package by use of a modified starch.

It is a still further object of the invention to disclose a desiccant composition contained within a packaging material which is designed for absorption of moisture in order to maintain a relatively low humidity level.

It is a still further object of the invention to disclose a desiccant composition contained within a packaging material which is designed for absorption of moisture in order to maintain a relatively high humidity level.

These and other objects and features of the present invention will become apparent to those skilled in the art from a consideration of the following detailed description, drawings and claims. The description, along with the accompanying drawings, provides a selected example of the construction of the product and process to illustrate the invention.

SUMMARY OF INVENTION

In accordance with the present invention there is provided a desiccant composition comprising calcium chloride and/or other deliquescent salts and a modified starch, wherein the calcium chloride and/or other deliquescent salts comprises at least about 5 to about 95 percent of the composition by weight and the modified starch from about 5 to about 95 percent of composition. In the preferred embodiment calcium chloride and/or other deliquescent salts comprises from about 20 to about 95 percent of the composition by weight while the modified starch comprises from about 5 to about 80 percent of the composition by weight.

BRIEF DESCRIPTION OF THE DRAWINGS

This invention will now be described with reference to the accompanying drawings in which.

DETAILED DESCRIPTION OF THE PREFERRED EMBODIMENT

Figure 1:
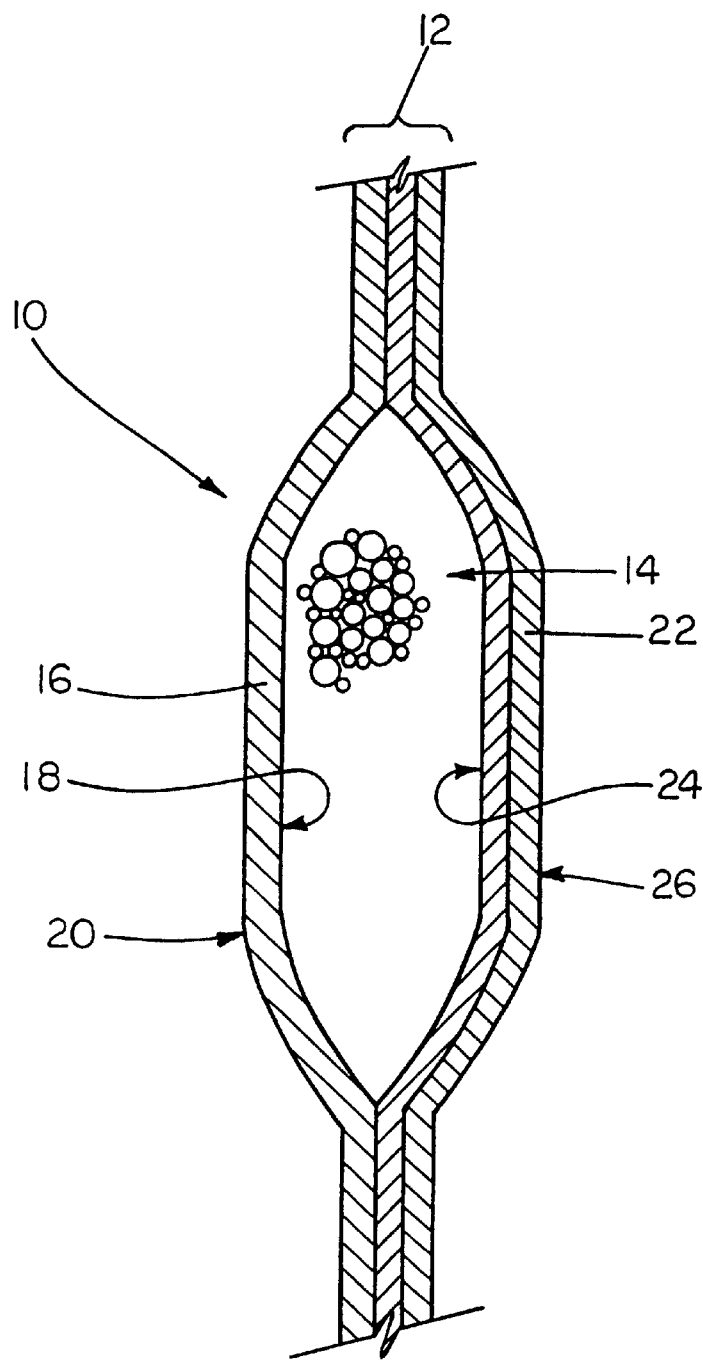
FIG. 1 is a perspective view of the desiccant container.

Although the invention is adaptable to a wide variety of uses, it is shown in the drawings for the purpose of illustration as embodied in a desiccant container (10) for absorbing and immobilizing a liquid comprised of a desiccant packaging material (12) encapsulating a liquid absorbing and immobilizing desiccant material (14). See FIG. 1.

The desiccant packaging material (12) may comprise any conventional packaging material. Preferably, it comprises a laminated film layer (16) with an inner (18) and outer (20) surface preferably formed from an uncoated microporous or nonwoven film layer sealed to an uncoated, water vapor permeable laminate film (22) with an inner (24) and outer (26) surface. The inner surface of the layers are sealed at the edges as shown in FIG. 1.

Conventional microporous or nonwoven films used for the manufacture of a laminated packaging material have been formed into a composite film bonded to another layer of material. Conventionally, the bonding of the two layers is accomplished by the use of an adhesive which coats one or both of the inside surfaces of the layers. It has been surprisingly discovered that strong, laminated desiccant packaging materials can be produced from uncoated microporous or nonwoven films.

The uncoated microporous or nonwoven film (16) comprises a film having a plurality of fine openings, which film is gas permeable, but water impermeable when there is no difference between the air pressure outside of the film and inside of the film. The size of the openings is preferably in the range of about 0.01 to 50 microns. The uncoated microporous or nonwoven film may constitute a single film layer or may comprise a laminate of separate microporous film layers. Preferably the film is a single layer microporous film formed from a polyolefinic material, such as polyethylene, polypropylene, poly(fluorinated ethylene), ethylene vinyl acetate, ethylene acrylic ester and the like. The uncoated microporous or nonwoven film may be prepared by any conventional film forming process including cold orientation of the film, orientation of different substance-containing films, extraction of different substances from different substance-containing films, extraction of different substance-containing film followed by orientation of the treated film, cross-dispersing of a bundle of fibers followed by heat-pressing the resulting film and any other conventional procedures utilized for the formation of a microporous film. Many such microporous films are commercially available and are sold, for example, under the name Celgard® (Hoechst Celanese Corporation), GORE-TEX® (Gore & Co. Gmbh) and Tyvek® (E. I. DuPont). The preferred microporous film has a Gurley-type air permeability of about 0.01 to 10,000 sec./100 milliliters, preferably 1 to 1,000 second/100 milliliters and most preferably less than about 400 seconds/100 milliliters. Preferably, the microporous film is a polyethylene or polypropylene-based microporous film and most preferably a polyethylene spun-bonded paper such as Tyvek® 1025 BL, 1059B or 107337B manufactured by E. I. DuPont, or a polypropylene based film, such as GDT II and GDT IV manufactured by San Ai, Ltd. of Osaka, Japan.

The second layer of the desiccant packaging material is preferably formed from the uncoated laminate film (22). The laminate film can be formed of conventional polymeric materials. The critical aspect of the composition of the laminate film is that its inner surface (24), which is bonded to the inner surface (18) of the uncoated microporous or nonwoven film layer at the edges of the packaging material, must be comprised of materials which are compatible with the composition of the inner surface of the microporous or nonwoven film layer. Materials that can be used to form this laminate film include conventional polyolefinic materials such as polyolefinic polypropylene, polyolefinic polyethylene, polyesters and the like. Preferably, the uncoated laminate film has a lower moisture vapor transmission rate than the microporous or nonwoven film. Also preferably the softening temperature of the uncoated laminate film is lower than or equal to the softening temperature of the inner surface of the uncoated microporous film. Preferably the laminate film is comprised of a laminated film comprising a high melting or softening point material, such as polyester, located on one side laminated to a lower melting point material, such as polypropylene on the opposite side. Examples of acceptable laminate film include, for example, RPP91-1964 or RPP-31-1007a manufactured by RollPrint.

The outer surface (26) of the laminate film are preferably formed from materials which are incompatible with the microporous layer, such as materials having a higher melting or softening point than that of the inner surface of the microporous film, such as polyester material. In contrast, the inner surface of the laminate film (24) must be formed from a material which is compatible with the inner surface (18) of the microporous film. By having the two inner surfaces formed from compatible materials, a strong bond is formed between those layers when they are heat sealed together.

"Compatible" means that the materials mix on a molecular scale and will crystallize homogeneously. Thus, while such layers may not have precisely the same softening point, they should have softening points which are consistent, so that the materials will mix on a molecular level. Compatible bonds generally have a bond strength of at least about 5 lb./in. or more. For example, the compatible materials may include high density, low density, or linear low-density polyethylenes as well as nonoriented, bi-axially oriented or laminated polypropylenes. In contrast, the outer surface of at least the laminate film should be manufactured from incompatible materials such as polyester or nylon or a polyethylene or polypropylene material with a higher softening point than the inner surface of the laminate film material.

In addition, it is also critical that the inner surface of both the laminate film and the microporous or nonwoven film be uncoated with an adhesive. Coated film, when sealed to other coated or uncoated films, frequently form poor quality, weak seals. In addition, the sealing machines used for sealing coated films are also more expensive and more difficult to operate, resulting in greater expense for the manufacture of sealing coated films. Further, uncoated films are generally less expensive than coated films, sometimes by as much as 50 percent.

Suitable materials for use as the desiccant material to be incorporated into the desiccant package include conventional desiccating material such as silica gel, clays, natural or synthetic zeolites, calcium chloride, alkali metal carboxylate salts of starch—polyacrylonitrile, sodium polyacrylate, various deliquescent salts, wherein the anions include nitrate, nitrite, chloride, bromide, fluoride, sulfate, sulfite, thiosulfate, carbonate, carboxylate, phosphate and iodide and wherein the cations include ammonium, alkali, alkaline earth, earth and transition metals such as lithium, sodium, potassium, rubidium, cesium, magnesium, calcium, strontium, barium, aluminum, zinc, and iron and other desiccating products that absorb, gel or thicken upon contact with water or water vapor. If low humidity applications are desired (relative humidity less than about 20 percent), the deliquescent salts include zinc chloride, lithium chloride, zinc bromide, lithium bromide, zinc iodide and lithium iodide. When medium to high humidity applications are desired (greater than 20 percent relative humidity), the deliquescent salts may include $CaCl_2$, $MgCl_2$, $Zn(NO_3)_2$, and $K_2(CO_3)*2H_2O$. When high humidity applications are desired (higher than 50 percent relative humidity), the deliquescent salts may include $(NH_4)_2SO_4$, $NH_4Cl$, $Ca(NO_3)_2*2H_2O$, $Mg(NO_3)*6H_2O$, $K_2HPO_4$, $NH_4H_2PO_4$, $KHSO_4$, $Na_2CO_3*10H_2O$, $ZnSO_4*7H_2O$, $Na(C_3H_3O_2)*3H_2O$, $Na_2S_2O_3$, $KBr$, $Na_2SO_3*7H_2O$, $KI$, $NaI$, $NaNO_2$ $NaF$ and $NaHSO_4$.

It has been surprisingly discovered that a preferred desiccant material can be produced from a mixture of a deliquescent salt, such as those previously discussed, and a modified starch, most preferably a modified corn starch, such as MIRA-SPERSE® 623, 626 and 629 produced by A. E. Staley Manufacturing Company. The composition of this desiccant material is preferably about 5 to about 95 percent the deliquescent salt mixed with about 95 to about 5 percent of the modified starch. Preferably, the deliquescent salt comprises about 20 to about 95 percent while the modified starch comprises about 80 to about 5 percent of the composition. Most preferably the deliquescent salt comprises about 50 to about 80 percent while the modified starch comprises about 50 to about 20 percent of the composition.

In low humidity applications (less than 20 percent relative humidity) the preferred deliquescent salts in order of preference are: $LiCl > ZnCl_2 > ZnBr_2 > LiBr > ZnI_2 > LiI$. In medium to high humidity applications (greater than 20 percent relative humidity) the deliquescent salts in order of preference are: $CaCl_2 = MgCl_2$, $>K_2(CO_3)*2H_2O > (Zn(NO_3)_2$. In high humidity applications (greater than 50 percent relative humidity) the deliquescent salts in order of preference are: $NH_4Cl$, $Na_2CO_3*10H_2O$, $(NH_4)_2SO_4$, $Ca(NO_3)_2*2H_2O$, $Mg(NO_3)*6H_2O$, $K_2HPO_4$, $NH_4H_2PO_4$, $ZnSO_4*7H_2O$, $Na(C_3H_3O_2)*3H_2O$, $Na_2S_2O_3$, $KBr$, $Na_2SO_3*7H_2O$, $KI$, $NaI$, $NaNO_2$, $NaF$, $KHSO_4$ and $NaHSO_4$.

The modified starches that are utilized in this invention can include conventionally modified starches, oxidized starch, enzyme-converted starches and modified starches containing functional groups such as hydroxyl, carbonyl, amino and amino groups. The term "starch" therefore as used throughout this specification and claims is intended to include any member of the family of starches, or mixture of two or more starches. The preferred starch is a modified starch, such as an oxidized, enzyme-converted starch. The modification to the starch may be chemical, such as by crosslinking or substitution, or physical, such as by granulation.

Ordinary starch, such as pearl starch, is not commonly utilized in its raw state because of its high viscosity and retrogradation, which is a particular problem with unmodified starches. These problems are reduced substantially with modified starches, such as hydroxyethylated starches. As such, most industries convert their unmodified starches to modified starches, such as oxidized, enzyme converted, phosphated or hydroxyethylated starch. Alternatively, a further modified starch, in the form of a cationic starch, can be used. However, the cost of such cationic starch is significant in comparison to either unmodified or starch. Critical to the choice of starch is its ability to absorb water, preferably cool water, i.e., less than about 40–50° C.

In a preferred embodiment the modified starch when combined with water must have a viscosity greater than water alone. When measured as Brookfield viscosity, the viscosity should be at least about 1.0 cps. The critical function supplied by the modified starch is the ability to mix with water and thicken or gel water or the deliquescent salt/water composition formed during the absorption of water by the deliquescent salt.

The deliquescent salt/corn starch desiccant composition can be used not only with the desiccant container outlined above, but also with any conventional desiccant container utilized for the absorption of water or water vapor.

The process for the formation of the desiccating container comprises a number of steps. The desiccant packaging material is first formed. To form the desiccant packaging material of the instant invention, the uncoated microporous and nonwoven film (16) is first formed or acquired from conventional sources. In a preferred embodiment the microporous film is an uncoated microporous or non-woven film such as Celgard® produced by Hoechst Celanese Corporation, Tyvek® Nos. 1025 BL, 1059B and 1073B produced by E. I. DuPont or certain other polypropylene-based non-woven films such as GDTI, II, IV produced by San Ai of Osaka, Japan. As stated above, the permeability of this microporous film should be in the range of about 1 to about 1,000 Gurley seconds per 100 milliliters and preferably less than about 400 seconds per 100 milliliters.

Following the formation of the uncoated microporous or nonwoven film, the uncoated laminate film (22) is formed. As stated above, this uncoated laminate film can be comprised of different layers of the same or different materials laminated together. However, the critical element of the composition of this material is that the film must be uncoated and the inner surface (24) of the laminate film, which is sealed to an inner surface (18) of the microporous material, must be formed of a material which is "compatible" with the inner surface of the uncoated microporous or nonwoven film. In one preferred embodiment, the laminate film is a laminated film containing a polyester material on the outer surface with a polypropylene material on the inner surface, such as RPP 91-1964 made by RollPrint. Another preferred embodiment is RPP 31-1007A, a polyethylene-based material also manufactured by RollPrint.

Following the formation of the two layers, the edges of the layers are sealed together by a conventional heat sealing procedure. One of the advantages of this product is that the bond formed between the two compatible, uncoated materials has a significantly greater strength than conventional bonds utilizing an adhesive coating. By utilizing the capability of compatible materials to form a strong seal without using an adhesive, the strength of the desiccant packaging material is significantly increased over conventional packaging materials. In addition, these uncoated materials have a lower cost of production and run better through the sealing equipment.

The preferred desiccant material is then placed within the desiccant packaging. By using the preferred desiccant material (14) formed from a deliquescent salt and a modified starch, lesser quantities of the desiccating material may be necessary than is used in conventional desiccating containers and still achieve the same level of moisture absorbency.

The mixture of the deliquescent salt and modified starch is prepared by placing the two components in a conventional mixing apparatus, such as tumble mixer or the two components can be fed directly into the desiccant packaging from two separate feeds. Other than the physical mixing of the materials, no additional processing is necessary for the deliquescent salt/modified starch composition. This simple mixing of the two materials produces a desiccant composition with great utility.

Following the addition of the desiccant material to the desiccant packaging material, the remaining unsealed edges of the desiccant container are sealed to complete the formation of the desiccant container.

EXAMPLES

Example 1

The water absorbing capability of a desiccant combination comprising corn starch with calcium chloride was tested. 133 grams of a 3 to 1 mixture of calcium chloride to Mirasperse 629 modified waxy corn starch sold by Staley Food Ingredients, Decatur, Ill. was placed in a conventional desiccant bag for a desiccant product, which product is sold by United Desiccants and known as "CONTAINER DRI®". The desiccant bag was placed in environmental chamber of 80 percent relative humidity at 25° C. for about two months. The results of this test are shown in attached Table 1.

Example 2

The same tests were run on a composition of 1 to 4 corn starch to calcium chloride utilizing the same type of Mirasperse 624 modified corn starch as was discussed in Example 1. The water absorption over time is shown in the attached Table 1.

Example 3

The water absorbance of a conventional 500 gram CONTAINER DRI® desiccant product produced by United Desiccants was compared with the products of Examples 1 and 2 using the same procedures as were used in Example 1. The water absorption capability of this product over time is also shown in Table 1.

In addition, the capacity of a 1/4 ratio modified starch/calcium chloride product of Example 2 was compared with the conventional 500 gram CONTAINER DRI® product. The capacity at 40 percent relative humidity, moisture uptake at 40 percent relative humidity, capacity at 80 percent relative humidity and moisture uptake at 80 percent relative humidity after two months are shown in Table 2.

TABLE 1

| Time, hr | 1:3 Corn Starch to Calcium Chloride ratio, % CAPACITY | 1:4 Corn Starch to Calcium Chloride ratio, % CAPACITY | Typical Container Dri, % CAPACITY |
| --- | --- | --- | --- |
| 5.5 | 8.252063 | 10.16 | 1.8 |
| 22.5 | 31.28282 | 36.4 | 2.5 |
| 24 | 36.53413 | 43.2 | 2.88 |
| 28.5 | 38.4096 | 45.04 | 10.59 |
| 94.5 | 54.83871 | 58.64 | 33 |
| 120 | 60.54014 | 64.4 | 38.06 |
| 150 | 92.04801 | 96.08 | 41.58 |
| 169 | 100.9002 | 104.08 | 46.11 |
| 174 | 108.8522 | 114.32 | 47.43 |
| 198 | 121.9805 | 116.3158 | 48.61 |
| 265 | 150.2626 | 147.0677 | 55 |

TABLE 2

| | CAPACITY at 40% RH | MOISTURE UPTAKE (g) at 40% RH | CAPACITY at 80% RH | MOISTURE UPTAKE (g) at 80% RH |
|---|---|---|---|---|
| 1:4 RATIO MODIFIED STARCH/ CaCl2 IN 5 ¾ × 7" BAG | 111.4 | 151.7 | 339.4 | 462.1 |
| NORMAL 500 g CONTAINER DRI Bag | 29.9 | 149.6 | 66.1 | 330.7 |

As is clear from these examples, greater water absorption is shown for a composition of corn starch and calcium chloride in comparison with the conventional desiccant material. This water absorption capability is at least as good as conventional desiccant packages conventionally sold. In addition, the desiccating composition of Example 2 was compared with the CONTAINER DRI® product after 265 hours. Because of the capability of the starch to absorb the water and the liquid calcium chloride on the surface of the calcium chloride product, water did not leak from the container even after three months.

Example 4

100 g of calcium chloride was mixed with 25 g of modified starch (Mirasperse 629, manufactured by Staley Food Ingredients) and placed in a bag manufactured according to U.S. Pat. No. 5,743,942. The absorption capacity measured at 25° C., 80 percent relative humidity (r.h.) after 14 days was 230 percent by weight. The bag did not show any signs of leakage through the microporous films or seals, and the bag contained a firm gel (viscosity 33 Pas at 5 rpm, 15 Pas at 50 rpm).

Example 5

100 g of magnesium chloride was mixed with 25 g of modified starch (Mirasperse 629, manufactured by Staley Food Ingredients) and placed in a bag manufactured according to U.S. Pat. No. 5,743,942. The absorption capacity measured at 25° C., 80 percent r.h. after 14 days was 305 percent by weight. The bag did not show any signs of leakage through the microporous films or seals, and the bag contained a firm gel (viscosity 60 Pas at 5 rpm, 23 Pas at 50 rpm).

Example 6

100 g of magnesium chloride was mixed with 20 g of modified starch (Mirasperse 629, manufactured by Staley Food Ingredients) and placed in a bag manufactured according to U.S. Pat. No. 5,743,942. The absorption capacity measured at 25° C., 80 percent r.h. after 14 days was 307 percent by weight. The bag did not show any signs of leakage through the microporous films or seals, and the bag contained a firm gel (viscosity 32 Pas at 5 rpm, 21 Pas at 50 rpm).

As is clear from Examples 4 through 6, greater water absorption occurs with a composition of a modified starch blended with magnesium chloride than the same modified starch blended with calcium chloride. This increased absorption capacity per weight can find great utility when high moisture absorption capacities are required.

Example 7

100 g of $CaCl_2$, $ZnCl_2$, $LiCl$, $(NH_4)_2CO_3$, $NH_4Cl$ and $NaHSO_4$ were individually mixed with 25 g of modified starch (Mirasperse 629, manufactured by Staley Food Ingredients) and placed in a bag manufactured according to U.S. Pat. No. 5,743,942. The absorption capacity was measured at 25° C., 80% r.h., 25° C., 20% r.h. and 25° C. and 90% r.h. after 48 hours.

The following table summarizes the experimental results:

TABLE 3

| Salt | Absorption at 20% r.h. | Absorption at 80% r.h. | Absorption at 90% r.h. |
|---|---|---|---|
| $CaCl_2$ | 19% | 127% | 270% |
| $ZnCl_2$ | 25% | 84% | N.d. |
| $LiCl$ | 30% | 146% | N.d. |
| $(NH_4)_2CO_3$ | 0% | 11% | 70% |
| $NH_4Cl$ | 0% | 12% | 140% |
| $NaHSO_4$ | 0% | 56% | N.d. |

N.d. = Not determined

All except one bag did not show any signs of leakage through the microporous films or seals, and the bags contained firm gels (viscosity>25 Pas at 5 rpm, >15 Pas at 50 rpm). The mixture with $NaHSO_4$ did not form a gel, due to the chemical breakdown of the starch used.

The table clearly shows that a combination of $ZnCl_2$ or $LiCl$ with starch is preferable if high capacity is needed at low relative humidity levels.

If low absorption under humidity conditions less than about 80% r.h. is required, mixtures of starch with $NH_4Cl$ and $(NH_4)_2CO_3$ are preferred, as they do not start to absorb significant amounts of moisture at less than 80% r.h. but show considerable absorption at higher humidity levels near the dew point.

What is claimed is:

1. A desiccant composition comprising a deliquescent salt and a modified starch, wherein the deliquescent salt comprises at least about 5 to about 95 percent of the composition by weight and the modified starch from about 5 to about 95 percent of the composition, by weight.

2. The desiccant composition of claim 1 wherein the deliquescent salt comprises from about 20 to about 95 percent of the composition by weight and the modified starch from about 5 to about 80 percent of the composition by weight.

3. The desiccant composition of claim 1 wherein the deliquescent salt comprises from about 50 to about 80 percent of the composition by weight and the modified starch from about 20 to about 50 percent of the composition by weight.

4. The desiccant composition of claim 1 wherein the modified starch comprises a modified corn starch.

5. The desiccant composition of claim 1 wherein the deliquescent salt is selected from the group consisting of alkali, ammonium, alkali earth, earth and transition metal halides, sulfates, sulfites, thiosulfates, nitrates, nitrites, phosphates, carbonates and carboxylates.

6. The desiccant composition of claim 1 wherein the deliquescent salt is selected from the group consisting of $LiCi$, $LiBr$, $LiI$, $ZnCl_2$, $ZnBr_2$, $LiI$, $Ca(NO_3)_2*2H_2O$, $NaHSO_4$, $Mg(NO_3)*6H_2O$, $KI$, $NaI$, $NaNO_2$, $KBr$, $(NH_4)_2SO_4$, $Na(C_3H_3O_2)*3H_2O$, $Na_2S_2O_3$, $NH_4Cl$, $KHSO_4$, $Na_2CO_3*10H_2O$, $ZnSO_4*7H_2O$, $K_2HPO_4$, $Na_2SO_3*7H_2O$, $NaF$, $K_2(CO_3)_2*2H_2O$, $Zn(NO_3)_2$, $NH_4H_2PO_4$ and $MgCl_2$.

7. The desiccant composition of claim 1 wherein the deliquescent salt comprises magnesium chloride.

8. The desiccant composition of claim 1 wherein the deliquescent salt is selected from the group consisting of zinc chloride and lithium chloride.

9. The desiccant composition of claim 1 wherein the deliquescent salt is selected from the group consisting of ammonium chloride, ammonium sulfate and ammonium carbonate.

10. A desiccant composition for application under conditions where the relative humidity is less than about 20 percent comprising a deliquescent salt selected from the group consisting of $ZnCl_2$, LiCl, $ZnBr_2$, LiBr, $ZnI_2$, LiI and a modified starch, wherein the deliquescent salt comprises at least about 5 to about 95 percent of the composition, by weight, and the modified starch comprises from about 5 to about 95 percent of the composition, by weight.

11. The desiccant composition of claim 10 wherein the deliquescent salt is selected from the group consisting of zinc chloride and lithium chloride.

12. A desiccant composition for application under conditions where the relative humidity is greater than about 20 percent, comprising a deliquescent salt selected from the group consisting of $Ca(NO_3)_2 * 2H_2O$, $NaHSO_4$, $Mg(NO_3) * 6H_2O$, KI, NaI, $NaNO_2$, KBr, $(NH_4)_2SO_4$, $Na(C_3H_3O_2) * 3H_2O$, $Na_2S_2O_3$, $NH_4Cl$, $KHSO_4$, $Na_2CO_3 * 10H_2O$, $ZnSO_4 * 7H_2O$, $K_2HPO_4$, $Na_2SO_3 * 7H_2O$, NaF, $K_2(CO_3)_2 * 2H_2O$, $ZN(NO_3)_2$, $NH_4H_2PO_4$ and $MgCl_2$ and a modified starch, wherein the deliquescent salt comprises at least about 5 to about 95 percent of the composition, by weight, and the modified starch comprises from about 5 to about 95 percent of the composition, by weight.

13. The desiccant composition of claim 12 wherein the deliquescent salt comprises magnesium chloride.

14. The desiccant composition of claim 12 wherein the deliquescent salt is selected from the group consisting of $NH_4Cl$, $(NH_4)_2SO_4$ and $(NH_4)_2CO_3$.

15. A desiccant composition for application under conditions where the relative humidity is greater than about 50 percent, comprising a deliquescent salt selected from the group consisting of $NH_4Cl$, $Na_2CO_3 * 10H_2O$, $(NH_4)_2SO_4$, $Ca(NO_3)_2 * 2H_2O$, $Mg(NO_3)_2 * 6H_2O$, $K_2HPO_4$, $NH_4H_2PO_4$, $ZnSO_4 * 7H_2O$, $Na(C_3H_3O_2) * 3H_2O$, $Na_2S_2O_3$, KBr, $Na_2SO_3 * 7H_2O$, KI, NaI, $NaNO_2$, NaF, $KHSO_4$ and $NaHSO_4$ and a modified starch, wherein the deliquescent salt comprises at least about 5 to about 95 percent of the composition, by weight, and the modified starch comprises from about 5 to about 95 percent of the composition, by weight.

16. A desiccant container comprising a desiccant composition secured within a water vapor permeable film product, wherein the desiccant composition comprises a deliquescent salt and a modified starch, wherein the deliquescent salt comprises at least about 5 to 95 percent of the composition by weight and the modified starch from about 5 to 95 percent of the composition by weight.

17. The desiccant container of claim 16 wherein the deliquescent salt comprises from about 20 to about 95 percent of the desiccant composition by weight and the modified starch from about 5 to about 80 percent of the composition by weight.

18. The desiccant container of claim 16 wherein the deliquescent salt comprises from about 50 to about 80 percent of the desiccant composition by weight and the modified starch from about 20 to about 50 percent of the composition by weight.

19. The desiccant composition of claim 16 wherein the deliquescent salt comprises magnesium chloride.

20. The desiccant composition of claim 16 wherein the deliquescent salt is selected from the group consisting of zinc chloride and lithium chloride.

21. The desiccant composition of claim 16 wherein the deliquescent salt is selected from the group consisting of ammonium chloride, ammonium sulfate and ammonium carbonate.

22. A process for manufacturing a desiccant container comprising
  (a) preparing a water vapor permeable film product,
  (b) preparing a desiccant composition wherein the desiccant composition comprises a deliquescent salt and a modified starch wherein the deliquescent salt comprises at least about 5 to 95 percent of the composition by weight and the starch from about 5 to about 95 percent of the composition by weight,
  (c) placing the desiccant composition between layers of the water vapor permeable film product, and
  (d) sealing edges of the water vapor permeable film product around the desiccant composition to produce the desiccant container.

23. The process of claim 22 wherein the deliquescent salt comprises magnesium chloride.

24. The process of claim 22 wherein the deliquescent salt is selected from the group consisting of zinc chloride and lithium chloride.

25. The process of claim 22 wherein the deliquescent salt is selected from the group consisting of ammonium chloride, ammonium sulfate and ammonium carbonate.

\* \* \* \* \*